US008378879B2

(12) United States Patent
Lewis et al.

(10) Patent No.: US 8,378,879 B2
(45) Date of Patent: Feb. 19, 2013

(54) APPARATUS AND METHODS FOR REMOTE DETECTION OF PHYSIOLOGICAL CHANGES

(75) Inventors: Douglas L. Lewis, Sykesville, MD (US); Andrew E. Feldman, Columbia, MD (US); Christopher L. Eddins, Jessup, MD (US)

(73) Assignee: The Johns Hopkins University, Baltimore, MD (US)

( * ) Notice: Subject to any disclaimer, the term of this patent is extended or adjusted under 35 U.S.C. 154(b) by 391 days.

(21) Appl. No.: 12/817,765

(22) Filed: Jun. 17, 2010

(65) Prior Publication Data
US 2010/0321232 A1 Dec. 23, 2010

Related U.S. Application Data

(60) Provisional application No. 61/268,993, filed on Jun. 18, 2009.

(51) Int. Cl.
G01S 13/56 (2006.01)
G01S 7/40 (2006.01)
G01S 13/00 (2006.01)
G01S 7/00 (2006.01)

(52) U.S. Cl. .............. 342/28; 342/27; 342/89; 342/165; 342/173; 342/174; 342/175; 342/195

(58) Field of Classification Search .................... 342/27, 342/28, 70–72, 118, 128–133, 165, 173–175, 342/195, 59, 73, 82, 83, 89, 98, 102, 103, 342/120, 122, 123, 200, 201; 600/300, 481, 600/508, 529, 534–536
See application file for complete search history.

(56) References Cited

U.S. PATENT DOCUMENTS

| 3,046,548 A |   | 7/1962  | Briskin |         |
|-------------|---|---------|---------|---------|
| 3,264,644 A | * | 8/1966  | Jacob   | 342/103 |
| 3,679,983 A | * | 7/1972  | Theriot | 342/174 |
| 3,796,208 A | * | 3/1974  | Bloice  | 600/534 |
| 3,993,995 A |   | 11/1976 | Kaplan et al. | |
| 4,085,740 A |   | 4/1978  | Allen, Jr. | |
| 4,107,679 A | * | 8/1978  | Strauch et al. | 342/122 |
| 4,107,684 A | * | 8/1978  | Watson, Jr. | 342/128 |
| 4,123,719 A | * | 10/1978 | Hopwood et al. | 342/174 |
| 4,231,008 A |   | 10/1980 | Krueger | |
| 4,344,440 A |   | 8/1982  | Aaby et al. | |

(Continued)

FOREIGN PATENT DOCUMENTS

WO WO 94/11755 5/1994
WO WO2007/133083 A1 * 11/2007

OTHER PUBLICATIONS

Jonathan Geisheimer and E. F. Greneker, III, Remote Detection of Decption Using Radar Vital Signs Monitor Technology, IEEE, 2000, pp. 170-173.

*Primary Examiner* — Bernarr Gregory
(74) *Attorney, Agent, or Firm* — Noah J. Hayward

(57) ABSTRACT

An apparatus for sensing motion having a transmitter for transmitting a carrier signal; a frequency control connected to the transmitter for controlling the frequency of the carrier signal; a first receiver for receiving the reflected transmitted carrier signal; a second receiver for receiving the reflected transmitted carrier signal, the second receiver being placed out of phase by less than a wavelength of the carrier signal from the first receiver; means for subtracting the carrier signal received by the second receiver from the carrier signal received by the first receiver to produce an error signal; wherein when motion is sensed by the apparatus, the error signal moves from zero thereby causing a corrective signal to be generated and sent to the frequency control, the frequency control forcing the error signal to zero.

28 Claims, 5 Drawing Sheets

U.S. PATENT DOCUMENTS

| | | | |
|---|---|---|---|
| 4,499,467 A | 2/1985 | Rittenbach | |
| 4,503,401 A * | 3/1985 | Kyriakos et al. | 342/103 |
| 4,539,565 A * | 9/1985 | Norsworthy | 342/128 |
| 4,590,445 A * | 5/1986 | Tabourier et al. | 342/200 |
| 4,593,287 A * | 6/1986 | Nitardy | 342/200 |
| 4,754,277 A * | 6/1988 | Voyce | 342/83 |
| 4,958,638 A | 9/1990 | Sharpe et al. | |
| 5,093,656 A | 3/1992 | Dipoala | |
| 5,172,123 A * | 12/1992 | Johnson | 342/200 |
| 5,175,509 A * | 12/1992 | Taylor | 342/200 |
| 5,210,539 A * | 5/1993 | Voyce | 342/83 |
| 5,376,938 A * | 12/1994 | Martinez et al. | 342/128 |
| 5,387,918 A * | 2/1995 | Wiesbeck et al. | 342/128 |
| 5,448,501 A | 9/1995 | Hablov et al. | |
| 5,481,266 A | 1/1996 | Davis | |
| 5,507,291 A | 4/1996 | Stirbl et al. | |
| 5,642,081 A * | 6/1997 | Bosch et al. | 342/200 |
| 5,694,132 A * | 12/1997 | Johnson | 342/200 |
| 5,790,032 A * | 8/1998 | Schmidt | 342/28 |
| 5,936,524 A | 8/1999 | Zhevelev et al. | |
| 5,963,509 A * | 10/1999 | Lindmuller et al. | 342/122 |
| 6,031,482 A * | 2/2000 | Lemaitre et al. | 342/28 |
| 6,091,356 A * | 7/2000 | Sanders et al. | 342/132 |
| 6,271,959 B1 | 8/2001 | Kim et al. | |
| 6,420,998 B2 * | 7/2002 | Winter et al. | 342/174 |
| 6,492,933 B1 | 12/2002 | McEwan | |
| 6,545,634 B1 * | 4/2003 | Heide et al. | 342/128 |
| 6,621,449 B1 * | 9/2003 | Kunert | 342/70 |
| 6,703,969 B2 * | 3/2004 | Winter et al. | 342/174 |
| 6,870,500 B2 * | 3/2005 | Suess et al. | 342/175 |
| 6,909,397 B1 | 6/2005 | Greneker, III et al. | |
| 7,123,758 B2 | 10/2006 | Jeung et al. | |
| 7,199,749 B2 | 4/2007 | Greneker, III et al. | |
| 7,209,074 B2 * | 4/2007 | Taylor | 342/173 |
| 7,272,431 B2 | 9/2007 | McGrath | |
| 7,304,601 B1 * | 12/2007 | Edvardsson et al. | 342/123 |
| 2007/0066904 A1 | 3/2007 | Wiesmann et al. | |
| 2008/0238757 A1 | 10/2008 | Lin et al. | |
| 2009/0278728 A1 | 11/2009 | Morgan et al. | |

* cited by examiner

APPARATUS AND METHODS FOR REMOTE DETECTION OF PHYSIOLOGICAL CHANGES

CROSS-REFERENCE TO RELATED APPLICATIONS

This application relates to U.S. provisional application No. 61/268,993, filed on Jun. 18, 2009, which is incorporated herein by reference in its entirety.

STATEMENT OF GOVERNMENTAL INTEREST

This invention was made with Government support under National Science Foundation contract 11S-051869. The Government has certain rights in the invention.

BACKGROUND OF THE INVENTION

1. Field of the Invention

The present invention relates to apparatus and methods for remotely detecting small physiological changes in a human and, more specifically, to a phase difference locked loop circuit for out-of-band noise, motion artifacts and temperature drift reduction. More broadly, the invention can be used to reduce distortion and drift in any radar return.

2. Description of the Related Art

There is a need to be able to detect remotely small physiological changes in a human in order to measure the human's condition including physiological stress levels and viability. Measurable indices of autonomic nervous system (ANS) status such as heart rate variability (HRV) have been shown to be altered under stress. Neural inputs to the heart's sinoatrial node accelerate or decelerate the heart rate over varying time scales depending on the respiration (RESP) rate and the balance of tone of the two branches of the ANS. Mental stress has been shown in human studies to increase sympathetic tone, which shifts mean heart rate (HR) higher, and decrease parasympathetic tone, which in addition will reduce the variability of inter-beat intervals. Under a controlled protocol, in which a baseline of ANS activity can be established, shifting of mean HR and HRV can be used to indicate changing ANS state. Unfortunately, small physiological changes can be difficult to detect with sufficient accuracy remotely using radar systems because of non-linear response in derived motion signals and drifting of signal characteristics with temperature due to temperature-dependent properties of associated electronics. What is needed are apparatus and methods to determine inter-beat interval with sufficient fidelity to allow a determination of stress, viability and other human conditions to be performed remotely and accurately.

SUMMARY OF THE INVENTION

Therefore, the present invention has been made in view of the above problems and constraints, and provides an apparatus and methods to achieve the above objectives.

More specifically, the present invention is directed to an apparatus for sensing motion comprising: a transmitter for transmitting a carrier signal; a frequency control connected to the transmitter for controlling the frequency of the carrier signal; a first receiver for receiving the reflected transmitted carrier signal; a second receiver for receiving the reflected transmitted carrier signal, the second receiver being placed out of phase by less than a wavelength of the carrier signal from the first receiver; means for subtracting the carrier signal received by the second receiver from the carrier signal received by the first receiver to produce an error signal; wherein when motion is sensed by the apparatus, the error signal moves from zero thereby causing a corrective signal to be generated and sent to the frequency control, the frequency control forcing the error signal to zero.

The present invention is also directed to an apparatus for sensing motion comprising: a gunnplexer comprising: a diode for transmitting a carrier signal; a voltage control oscillator operatively connected to the transmitting diode for controlling the frequency of the carrier signal; a first diode for receiving the reflected transmitted carrier signal; and a second diode for receiving the reflected transmitted carrier signal, the second diode being placed 45 degrees out of phase with the first receiver; an amplifier for subtracting the voltage of the carrier signal received by the second diode from the voltage of the carrier signal received by the first diode to produce a voltage output; wherein when motion is sensed by the gunnplexer, the voltage output moves from zero thereby causing an error voltage to be generated, amplified and sent to the voltage control oscillator, the voltage control oscillator changing its frequency to force the error voltage to zero.

The present invention is further directed to a method for reducing distortion and drift in radar returns comprising: transmitting a carrier signal; controlling the frequency of the carrier signal; receiving the reflected transmitted carrier signal with a first receiver;
receiving the reflected transmitted carrier signal with a second receiver, the second receiver being out of phase by less than a wavelength of the carrier signal with the first receiver; subtracting the carrier signal received by the second receiver from the carrier signal received by the first receiver to produce an error signal; generating a corrective signal caused by the error signal moving from zero when a motion is sensed; and using the corrective signal to force the error signal to zero.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Reference will now be made in detail to the exemplary embodiments of the present invention, examples of which are illustrated in the accompanying drawings.

Figure 1:
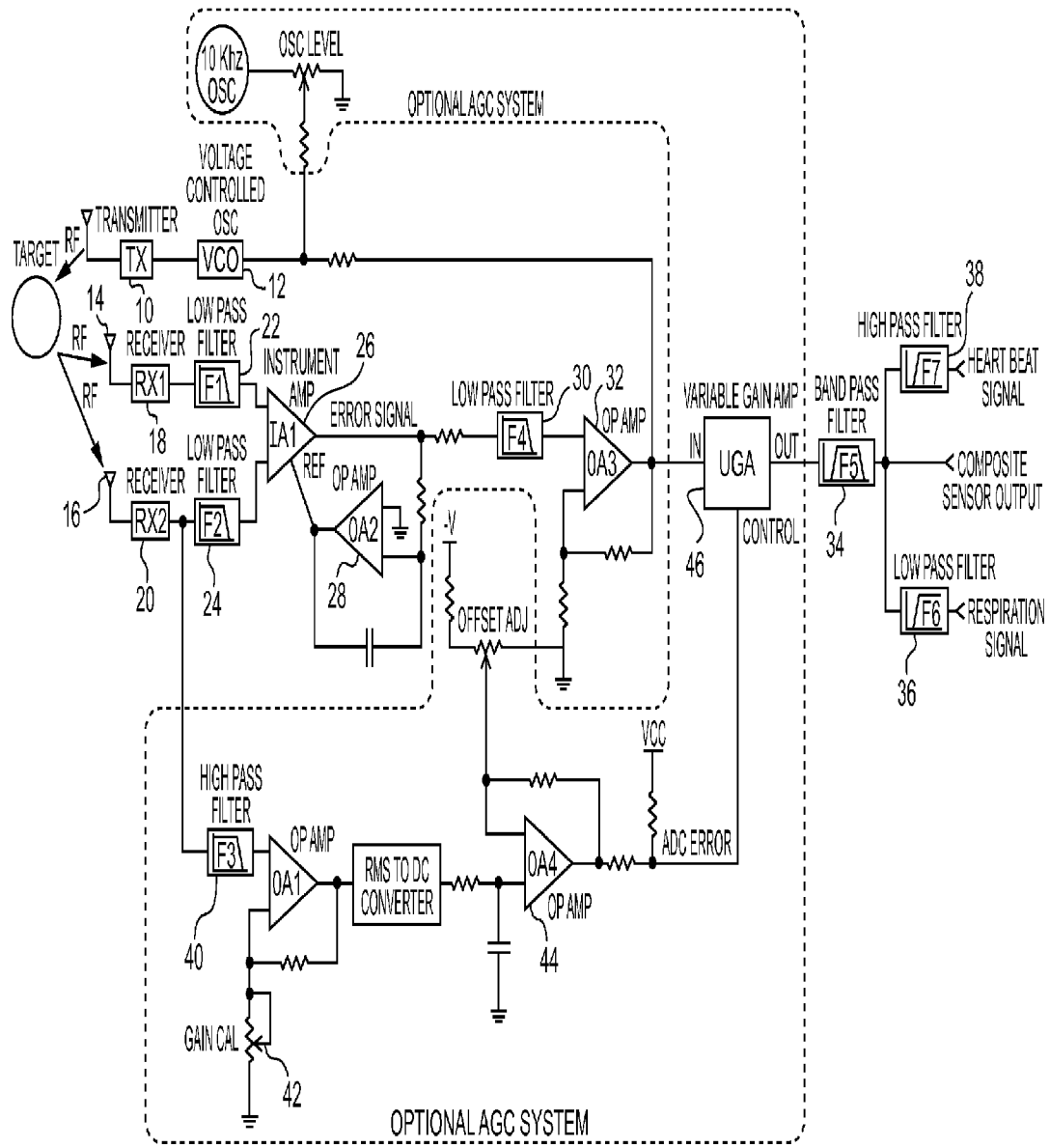
FIG. 1 illustrates an embodiment of the continuous wave phase difference locked loop of the invention with an optional $1/R^2$ compensation for signal return loss with distance.

As shown in FIG. 1, a transmitter, TX, 10 is a RF power amplifier, connected to an amplifier and fed by a Voltage controlled oscillator (VCO) 12. Signals reflected by a target are received by antennas 14, 16 connected to RX1 (receiver 1) 18 and RX2 (receiver 2) 20. RX1 and RX2 are separated by a fraction of the transmitted wave length (e.g. 90 degrees). F1 22 and F2 24 are low pass filters to remove any received signals greater in frequency than the signals of interest.

IA1 26 is an instrument amplifier that generates a loop error signal. This error signal is a nonzero value out of IA1. When the received amplitude of RX1 and RX2 are equal the error signal is zero volts. It should be noted that instead of an amplifier, a comparator may be used to detect a voltage difference of the carrier signal received by the second receiver from the carrier signal received by the first receiver to produce an error signal. OA2 28 is connected to the amplifier and configured as an integrator. This integrator compensates for very slow changes in frequency VCO (temperature drift).

As signals of interest vary in amplitude, the respiration signal is typically approximately 100× larger than the heart beat signal. These signals are detected as displacement of skin, or a change in the distance of the target relative to the fixed transmitter and receiver's location. The integrator can be used to reduce the large difference in these two signals. If the integrator RC value is reduced, the respiration signal amplitude can be selectively reduced, increasing the operation dynamic range of the system as the respiration signal is capable of much larger variation in amplitude (deep breath or holding breath).

F4 30 is identical to F1 and F2. OA3 32 amplifies the error signal to the level required by the VCO. Once the loop is closed, the frequency of the loop varies to compensate for the change in distance to the target.

Another way to look at the closed loop operation is that it is attempting to maintain a standing wave between the TX, the target and RX1, RX2. If the round trip distance increases, the TX frequency is decreased, acting in an accordion fashion. The result is that the output of OA3 is a voltage proportional to the change in the round trip distance between the TX/RXs and the target. The VCO control voltage is sent to the VCO control pin and is used as the sensor output. The sensor output passes through the F5 34 band pass filter, filtering any signals or noise outside the frequencies of interest. F5's output is available as the composite breathing and heart beat sign. F5 output is also fed to F6, F7 36, 38. F6 is a low pass filter removing the heart beat signal, leaving the respiration signal as the output of F6. F7 filters out the respiration and leaves the heart beat signal as an output.

As shown in FIG. 1 within the dotted line designated the Optional AGC (Automatic Gain Control) System, the signal, for example 10 KHz, detected amplitude varies with the round trip distance by $1/R^2$ (R=round trip distance), hence, as the received amplitude for RX gets smaller, the value of RX1-RX2 decreases for the same displacement at a larger R. To compensate, a fixed and constant level of modulation (10 KHz) that has a frequency much greater than the −3 db point (100 Hz) of F1, F2 and F4 is mixed with the error signal and then transmitted by TX. This eliminates any negative effects to the main control loop. The RX2 (or RX1) output is filtered by high pass filter F3 40, leaving only the received fixed 10 kHz signal. This signal is amplified and rectified to yield a DC voltage that is proportional to the received 10 kHz signal amplitude. The Gain Cal potentiometer 42 adjusts the DC gain used to cancel the $1/R^2$ signal reduction. The OA4 44 generates a difference signal between the set point and the DC value representing the 10 KHz received amplitude. This difference signal is applied to the control pin on the VGA 46. As the 10 KHz signal decreases the gain of the VGA is increased.

A single receiver may be used and the quadrature signal generated using the Hartley transform. The entire analog loop can be implemented with a microcontroller with an ADC (Analog to Digital Converter) input and a computer program in the microcontroller, yielding a DAC (Digital to Analog Converter) output to the VCO control pin. The sensor data, now digital, may be used in either digital and/or analog form (using a DAC or PWM).

Figure 2:
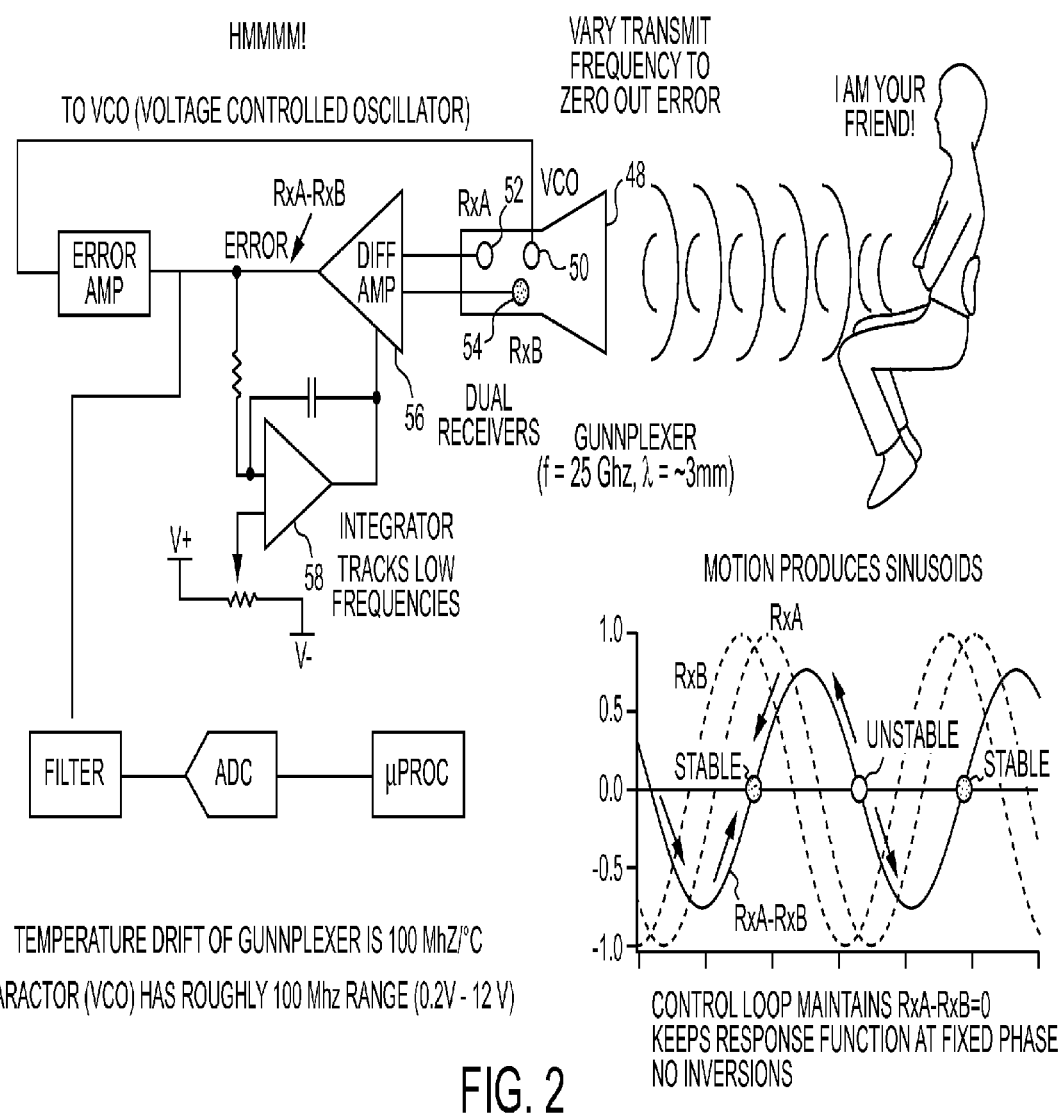
FIG. 2 illustrates a second embodiment of the invention.

FIG. 2 illustrates another embodiment of the invention in which a gunnplexer 48 generates a 24 GHz signal and transmits it through the horn antenna at the target of interest. The frequency of the transmitted signal can be varied by adjusting the VCO (Voltage Controlled Oscillator) 50 from 0.5 v to 18 v to yield a minimum of 100 Mhz change in the transmitted frequency.

Two mixer diodes physically placed 45 degrees (relative to the 24 GHz transmitted signal) apart, detect the reflected transmit signal. Additionally a small portion of the transmitted signal is fed to the mixer diodes. This results in two received Doppler signals 45 degrees apart. The direction of motion of the target is determined by looking at the phase relationship of receiver 1 (RXA) 52 and receiver 2 (RXB) 54. This 45 degree phase difference (i.e. RXA leads RXB) will reverse when the direction of motion relative to the horn transmitted output is reversed. The velocity is proportional to the instantaneous rate of the phase change of RXA or RXB.

The detector block is a differential amplifier 56 that subtracts RXB from RXA. (It should be noted that instead of an amplifier, a comparator may be used to detect a voltage difference of the carrier signal received by the second diode from the carrier signal received by the first diode to produce an error signal.) This results in a condition that when RXA=RXB the detector output is 0 v. Motion sensed by the gunnplexer causes the output to move from 0 v. The error that is generated is amplified and applied to the VCO pin on the gunnplexer so as to oppose this change. As the VCO frequency changes the error voltage is reduced until it is zero. At this point the VCO frequency stops changing, returning the system to a fixed and stable operation point where RXA=RXB. This behavior has several advantages. Most important is that the small motions of interest are maintained at a constant phase. Without stabilizing, the relative phase of RXA to RXB varies due to target motion and the phase and amplitude of the signal of interest can change phase by 180 degrees, causing identification of a small signal in noise very difficult.

An integrator 58 was added to the output of the detector to balance any DC signals on RXA and RXB. It has a very slow time constant and is also used to compensate for the large temperature coefficient of the transmit oscillator. This avoids drifting in the absence of a target and attenuates slow large magnitude motions yielding a much flatter baseline.

Figure 3A:
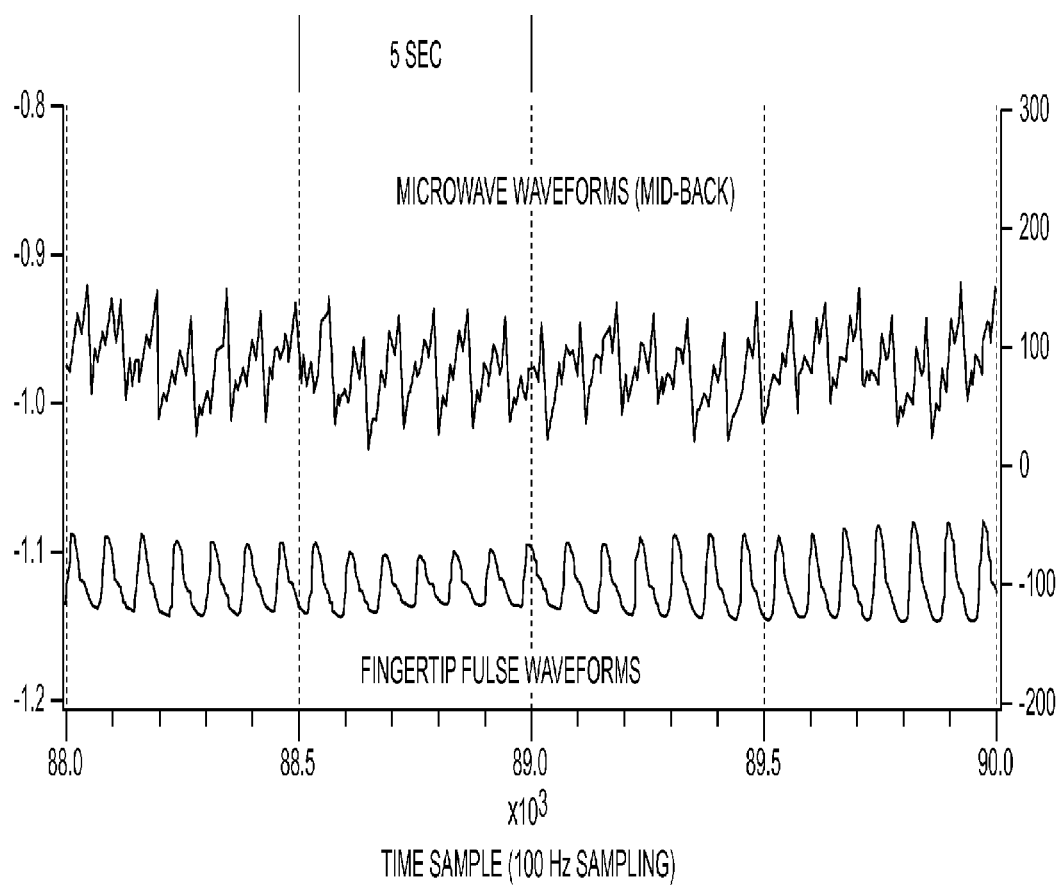
FIG. 3, consisting of FIGS. 3A and 3B, illustrates contact and non-contact sensor detected pulse waveforms.
Figure 3B:
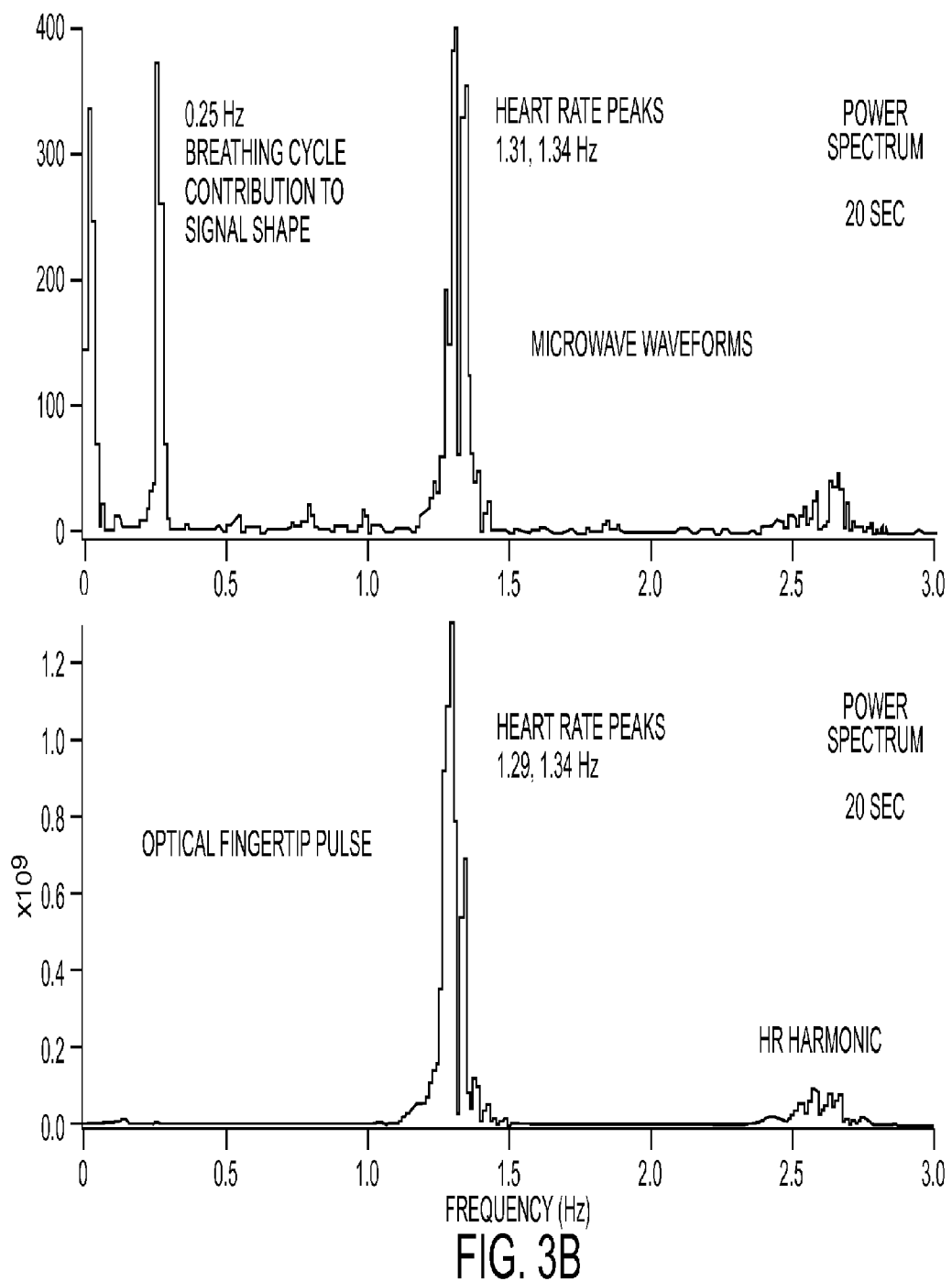
Figure 4:
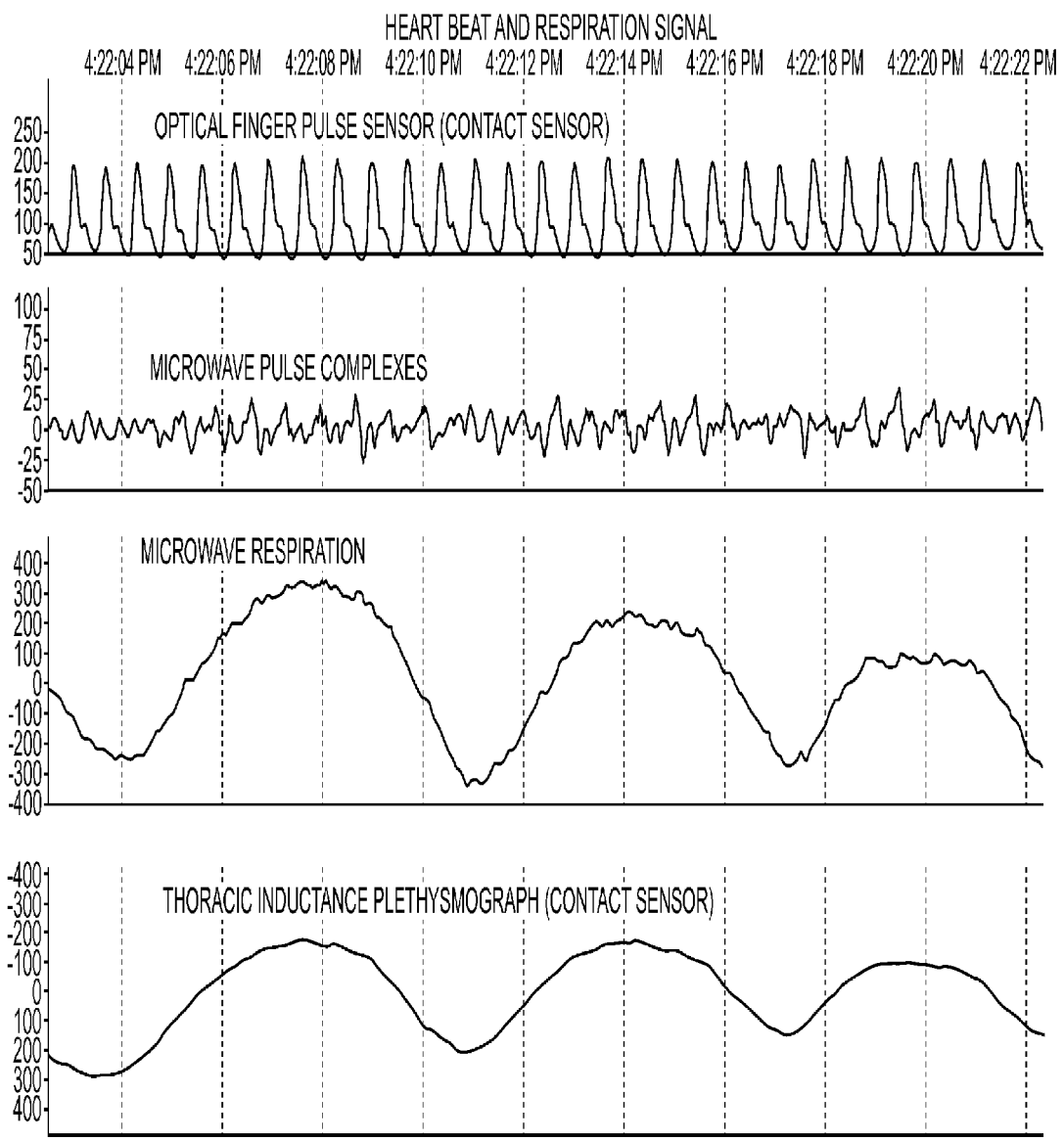
FIG. 4 illustrates detected pulse and respiration signals for both contact and non-contact sensors.

FIGS. 3A and 3B show a comparison of contact vs. non-contact pulse waveforms. FIG. 3B especially shows the ability of the invention to detect the signals of interest. FIG. 4 illustrates detected pulse and respiration signals for both contact and non-contact sensors.

Thus, the invention is not only useful in detecting physiological changes in humans but is useful in eliminating distortion and drift in any radar return.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. An apparatus for sensing motion comprising:
a transmitter for transmitting a carrier signal;
a frequency control connected to the transmitter for controlling the frequency of the carrier signal;
a first receiver for receiving the reflected transmitted carrier signal;
a second receiver for receiving the reflected transmitted carrier signal, the second receiver being placed out of phase by less than a wavelength of the carrier signal from the first receiver;
means for subtracting the carrier signal received by the second receiver from the carrier signal received by the first receiver to produce an error signal;
wherein when motion is sensed by the apparatus, the error signal moves from zero thereby causing a corrective signal to be generated and sent to the frequency control, the frequency control forcing the error signal to zero.

2. The apparatus as recited in claim 1, the transmitter, the oscillator, the first receiver and the second receiver comprising a gunnplexer.

3. The apparatus as recited in claim 1, the frequency control comprising an oscillator.

4. The apparatus as recited in claim 3, the oscillator comprising a voltage controlled oscillator.

5. The apparatus as recited in claim 1, the first receiver comprising a first diode and the second receiver comprising a second diode.

6. The apparatus as recited in claim 1, the transmitter comprising a diode.

7. The apparatus as recited in claim 1, wherein the second receiver is placed 45 degrees out of phase with the first receiver.

8. The apparatus as recited in claim 1, the means for subtracting comprising an amplifier.

9. The apparatus as recited in claim 1, the means for subtracting comprising software.

10. The apparatus as recited in claim 1, wherein the error signal is a voltage output.

11. The apparatus as recited in claim 10, wherein the means for subtracting subtracts a voltage of the carrier signal received by the second receiver from a voltage of the carrier signal received by the first receiver to produce the voltage output.

12. The apparatus as recited in claim 1, wherein the error signal is a change in the difference between the first and second receivers, the change being linearly proportional to the sensed motion.

13. The apparatus as recited in claim 1, wherein the corrective signal is amplified before being sent to the frequency control.

14. An apparatus for sensing motion comprising:
a gunnplexer comprising:
a transmitting diode for transmitting a carrier signal;
a voltage control oscillator operatively connected to the transmitting diode for controlling the frequency of the carrier signal;
a first diode for receiving the reflected transmitted carrier signal; and
a second diode for receiving the reflected transmitted carrier signal, the second diode being placed 45 degrees out of phase with a first receiver; and
an amplifier for subtracting the voltage of the carrier signal received by the second diode from the voltage of the carrier signal received by the first diode to produce a voltage output;
wherein when motion is sensed by the gunnplexer, the voltage output moves from zero thereby causing an error voltage to be generated, amplified and sent to the voltage control oscillator, the voltage controlled oscillator changing its frequency to force the error voltage to zero.

15. A method for reducing distortion and drift in radar returns comprising:
transmitting a carrier signal;
controlling the frequency of the carrier signal;
receiving the reflected transmitted carrier signal with a first receiver;
receiving the reflected transmitted carrier signal with a second receiver, the second receiver being out of phase by less than a wavelength of the carrier signal with the first receiver;
subtracting the carrier signal received by the second receiver from the carrier signal received by the first receiver to produce an error signal;
generating a corrective signal caused by the error signal moving from zero when a motion is sensed; and
using the corrective signal to force the error signal to zero.

16. The method as recited in claim 15, wherein an oscillator is used to control the frequency of the carrier signal.

17. The method as recited in claim 15, wherein a plurality of diodes are used to transmit and receive the carrier signal.

18. The method as recited in claim 15, wherein software is used to perform the subtracting step.

19. The method as recited in claim 15, wherein an amplifier is used to perform the subtracting step.

20. The method as recited in claim 15, wherein the error signal is a voltage output.

21. The method as recited in claim 15, wherein the corrective signal is amplified before being used to force the error signal to zero.

22. The method as recited in claim 15, wherein the error signal is a change in the difference between the first and second receivers, the change being linearly proportional to the sensed motion.

23. The method as recited in claim 15, further comprising applying a fixed and constant level of modulation to the received reflected transmitted carrier signal to compensate for a decrease in the error signal amplitude as the round trip distance traveled by the transmitted carrier signal increases.

24. The apparatus as recited in claim 1, the means for subtracting comprising a comparator for detecting a voltage difference of the carrier signal received by the second receiver from the carrier signal received by the first receiver to produce an error signal.

25. The apparatus as recited in claim 1, further comprising an integrator connected to the means for subtracting.

26. The apparatus as recited in claim 14, the amplifier comprising a comparator for detecting a voltage difference of the carrier signal received by a second receiver from the carrier signal received by the first receiver to produce the voltage output.

27. The method as recited in claim 15, the subtracting step comprising detecting a voltage difference of the carrier signal received by the second receiver from the carrier signal received by the first receiver to produce an error signal.

28. The apparatus as recited in claim 14, further comprising an integrator connected to the amplifier.

* * * * *

UNITED STATES PATENT AND TRADEMARK OFFICE
CERTIFICATE OF CORRECTION

| | | |
|---|---|---|
| PATENT NO. | : 8,378,879 B2 | Page 1 of 1 |
| APPLICATION NO. | : 12/817765 | |
| DATED | : February 19, 2013 | |
| INVENTOR(S) | : Douglas L. Lewis, Andrew B. Feldman and Christopher L. Eddins | |

It is certified that error appears in the above-identified patent and that said Letters Patent is hereby corrected as shown below:

On the Title Page under Item (75) Inventors, delete "Andrew B. Feldman, Columbia, MD" and insert --Andrew B. Feldman, Columbia, MD--.

Signed and Sealed this
Twenty-third Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,378,879 B2  
APPLICATION NO. : 12/817765  
DATED : February 19, 2013  
INVENTOR(S) : Douglas L. Lewis, Andrew B. Feldman and Christopher L. Eddins Page 1 of 1

It is certified that error appears in the above-identified patent and that said Letters Patent is hereby corrected as shown below:

On the Title Page under Item (75) Inventors, delete "Andrew E. Feldman, Columbia, MD" and insert --Andrew B. Feldman, Columbia, MD--.

This certificate supersedes the Certificate of Correction issued April 23, 2013.

Signed and Sealed this  
Second Day of July, 2013

Teresa Stanek Rea  
*Acting Director of the United States Patent and Trademark Office*